United States Patent
Poletto et al.

(10) Patent No.: US 9,112,936 B1
(45) Date of Patent: Aug. 18, 2015

(54) SYSTEMS AND METHODS FOR EPHEMERAL EVENTING

(71) Applicant: Dropbox, Inc., San Francisco, CA (US)

(72) Inventors: Stephen Poletto, San Francisco, CA (US); Thomas Wright, San Francisco, CA (US); Nils Peter Welinder, San Francisco, CA (US); Thomas Kleinpeter, San Francisco, CA (US); Andrew Haven, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/247,840

(22) Filed: Apr. 8, 2014

Related U.S. Application Data

(60) Provisional application No. 61/945,809, filed on Feb. 27, 2014.

(51) Int. Cl.
 *G06F 15/173* (2006.01)
 *H04L 29/06* (2006.01)
 *H04L 29/08* (2006.01)

(52) U.S. Cl.
 CPC ............ *H04L 67/42* (2013.01); *H04L 29/0809* (2013.01); *H04L 29/08117* (2013.01); *H04L 67/06* (2013.01)

(58) Field of Classification Search
 USPC .................................. 709/217–219, 232–235
 See application file for complete search history.

(56) References Cited

U.S. PATENT DOCUMENTS

| | | | |
|---|---|---|---|
| 6,629,100 B2 | 9/2003 | Morris et al. | |
| 7,240,053 B2 * | 7/2007 | Svendsen et al. | 707/771 |
| 7,542,994 B2 | 6/2009 | Anderson | |
| 7,653,302 B2 * | 1/2010 | Limberis et al. | 396/310 |
| 7,933,972 B1 * | 4/2011 | Issa et al. | 709/219 |
| 8,407,216 B2 | 3/2013 | Walker et al. | |
| 8,527,340 B2 | 9/2013 | Fisher et al. | |
| 8,554,020 B2 * | 10/2013 | Berger et al. | 382/305 |
| 2005/0210413 A1 * | 9/2005 | Quek et al. | 715/838 |
| 2006/0080286 A1 * | 4/2006 | Svendsen | 707/3 |

(Continued)

FOREIGN PATENT DOCUMENTS

| | | |
|---|---|---|
| WO | 2009153587 A1 | 12/2009 |
| WO | 2013032919 A1 | 3/2013 |
| WO | 2013127449 A1 | 9/2013 |

OTHER PUBLICATIONS

Eliza Kern, "Albumatic and Cluster try a fresh take on an old problem: group photo-sharing"; Feb. 27, 2013 Gigaom; URL: http://gigaom.com/2013/02/27/albumatic-and-cluster-try-a-fresh-take-on-an-old-problem-group-photo-sharing/.

(Continued)

*Primary Examiner* — Patrice Winder
(74) *Attorney, Agent, or Firm* — Keller Jolley Preece

(57) ABSTRACT

Embodiments are provided for ephemeral eventing. Ephemeral eventing may involve sending metadata portions associated with content items from a user device to a content management system prior to uploading the content portions of the content items. The content management system may then assign the content items to one or more events. The event assignments may then be sent back to the user device, allowing the content items to be locally displayed according to their events as if the content items had already been uploaded to the content management system.

27 Claims, 13 Drawing Sheets

(56) References Cited

U.S. PATENT DOCUMENTS

| | | | |
|---|---|---|---|
| 2006/0139709 A1* | 6/2006 | Bifano et al. | 358/527 |
| 2009/0157680 A1* | 6/2009 | Crossley et al. | 707/6 |
| 2009/0248711 A1* | 10/2009 | Martinez et al. | 707/100 |
| 2010/0076976 A1* | 3/2010 | Sotirov et al. | 707/737 |
| 2011/0069179 A1* | 3/2011 | Bathiche et al. | 348/207.1 |
| 2011/0270929 A1* | 11/2011 | Harrang et al. | 709/205 |
| 2011/0276423 A1 | 11/2011 | Davidson | |
| 2012/0079013 A1 | 3/2012 | Shepstone | |
| 2012/0203796 A1* | 8/2012 | Abraham et al. | 707/770 |
| 2012/0278387 A1* | 11/2012 | Garcia et al. | 709/204 |
| 2012/0331091 A1 | 12/2012 | Tseng | |
| 2013/0013687 A1* | 1/2013 | Liu | 709/204 |
| 2013/0086109 A1 | 4/2013 | Huang | |

OTHER PUBLICATIONS

Sarah Perez, "Cluster Brings Simple Group Photo-Sharing to Android"; Oct. 14, 2013 Techcrunch.com: URL: http://techcrunch.com/2013/10/14/cluster-brings-simple-social-photo-sharing-to-android/.

Tye Rattenbury Nahaniel Good and Mor Naaman, "Towards Autmatc Exaction of Event and Place Semantics from Flickr Tags"; SIGIR'07 (Special Interest Group on Information Retrieval) Jul. 23-27, 2007.

Matthew Cooper, Jonathan Foote, Andreas Girgensohn, and Lynn Wilcox, "Temporal Event Clustering for Digital Photo Collections"; MM'03 (2003 11th Annual ACM International Conference on Multimedia) Nov. 2-8, 2003.

* cited by examiner

| User_Account_ID | Local_ID | Global_ID | Content_Item Address | Descriptive Metadata Field 1 (Timestamp) | Descriptive Metadata Field I (Geolocation) | Descriptive Metadata Field N | Event_ID | Event Attribute 1 (Event Name) | Event Attribute N |
|---|---|---|---|---|---|---|---|---|---|
| Lisa_Lorentz | ZV9OD98P | AN79F59P | &A139865 | 2013-10-30 T 21:30 UTC | 37.766240, -122.404625 | | LK81N50R | Even and Paula's Wedding | |
| Lisa_Lorentz | YD82V23H | | | 2013-10-30 T 22:42 UTC | 37.763239, -122.404627 | | XK25J15X | Even and Paula's Wedding | |
| Lisa_Lorentz | LV53I15H | | | 2013-10-30 T 22:45 UTC | 37.766240, -122.404643 | | HD15Y95C | Even and Paula's Wedding | |
| Lisa_Lorentz | PH39J17Z | | | 2013-10-30 T 23:23 UTC | 37.763202, -122.404636 | | XO69S58T | Even and Paula's Wedding | |
| Lisa_Lorentz | NI82C58C | | | 2013-11-1 T 3:30 UTC | 37.776917, -122.404786 | | XY64P90X | Dinner at Marlowe | |
| Lisa_Lorentz | AG55I10V | | | 2013-11-1 T 3:31 UTC | 37.776909, -122.404760 | | AG25W69S | Dinner at Marlowe | |
| Mary_Maxwell | NC98N94B | VY95N58E | &B388955 | 2013-9-10 T 2:11 UTC | 37.778911, -122.389764 | | U50U30P | Giants Game at AT&T Park | |
| Mary_Maxwell | UV72Q59A | SQ37M50C | &F865175 | 2013-9-10 T 2:45 UTC | 37.778907, -122.389784 | | RG86C31E | Giants Game at AT&T Park | |
| Mary_Maxwell | | GW32O23 N | | | | | | | |
| Mary_Maxwell | DG30J62Z | | &B133232 | 2013-9-10 T 3:15 UTC | 37.778907, -122.389761 | | GO68V99D | Giants Game at AT&T Park | |
| Mary_Maxwell | DP94B44A | OS97228G | &D716333 | 2013-9-10 T 3:31 UTC | 37.778913, -122.389770 | | YY78L10P | Giants Game at AT&T Park | |
| Mary_Maxwell | LQ53X44A | | | 2013-9-10 T 4:25 UTC | 37.778895, -122.389757 | | XM42H13Q | Giants Game at AT&T Park | |

FIG. 5

SYSTEMS AND METHODS FOR EPHEMERAL EVENTING

CROSS-REFERENCE TO RELATED PROVISIONAL APPLICATION

This application claims the benefit of U.S. Provisional Patent Application No. 61/945,809, filed on Feb. 27, 2014, entitled "SYSTEMS AND METHODS FOR EPHEMERAL EVENTING," the disclosure of which is incorporated herein by reference in its entirety.

FIELD OF THE INVENTION

Various embodiments generally relate to systems and methods for ephemeral eventing.

BACKGROUND

Economies of scale and increases in the availability of high-speed network connections have made it cheap and convenient for users to store digital content in a remote storage system instead of, or in addition to, local user device storage components. Besides simply storing users' data, such remote storage systems can offer various content management solutions to improve the user experience. The user experience may suffer, however, when content cannot be immediately synchronized between a user's local user device and the content management system.

Synchronizing content items may involve sending content items from a user device to the content management system, performing at least one management function on the content items at the content management system, and sending the content items and/or the output of the management functions to the user device (and additional user devices as appropriate). In circumstances in which the content items cannot be synchronized quickly, the user may not be able to take advantage of the management functionality provided by the content management system.

SUMMARY

Systems and methods for ephemeral eventing are provided. Ephemeral eventing may improve the user experience by permitting a user to view content items within a user interface on a local user device in the context of logical sets, called "events," while the content item is queued for uploading, but not yet uploaded, to the server. In order to provide a seamless user experience, metadata associated with content items stored on the local user device may be sent to the content management system, which may then determine appropriate eventing data for the content item and send the eventing data back to the local user device. The local user device may then immediately render the content items in a user interface according to the eventing data received from the content management system. Because metadata typically represents only a small fraction of a content item's file size, the metadata upload/eventing data download may be processed quickly enough such that the user perceives no delay between, for example, taking a picture with an user device and having that picture rendered on a display of the user device in a user interface that incorporates the eventing data. Transmission of the content portion of the content item may then be scheduled for an appropriate time, such as when the user device is connected to a high-bandwidth network connection.

Metadata received at the content management system may be used to create an ephemeral item, store the ephemeral item in a content item database, and assign eventing data to the ephemeral item. The eventing data may then be sent back to the user device from which the metadata was received to permit immediate rendering of the content item along with the eventing data. Once the content portion of the content item is received at the content management system, the ephemeral item may be replaced by the content item. The content management system may periodically or continuously refine the eventing data associated with content items both on the content management system and on the user device based upon various factors, including data retrieved from the content management system, data retrieved from a $3^{rd}$ party server, data retrieved from an Internet news source, calendar entry data, and/or shared content items, for example.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 5-12 show flowcharts of illustrative processes for ephemeral eventing, in accordance with some embodiments.

DETAILED DESCRIPTION OF THE DISCLOSURE

Figure 1:
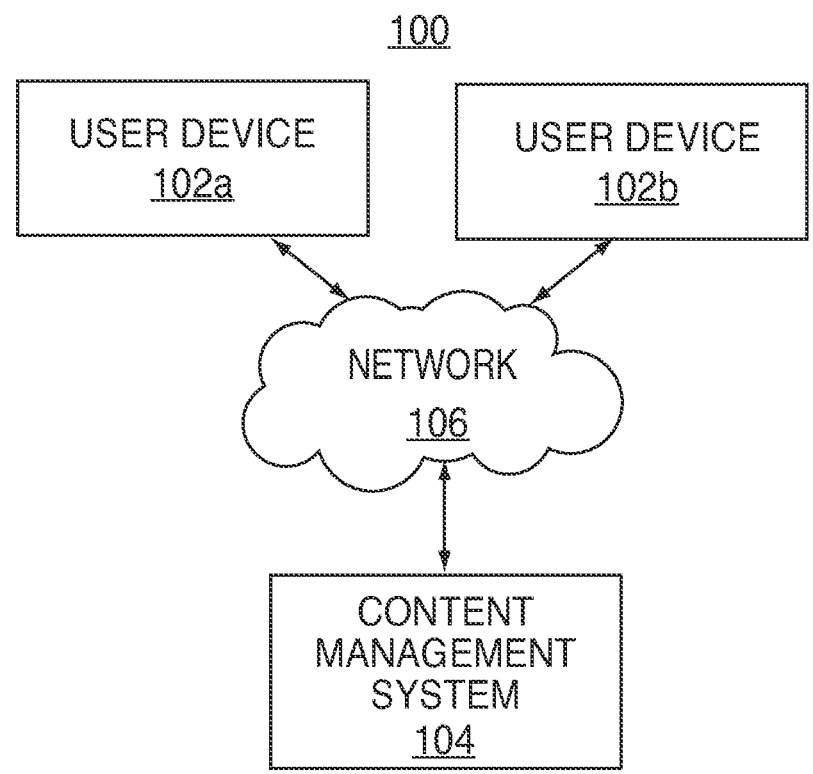
FIG. 1 shows a schematic view of an exemplary content management system for ephemeral eventing, in accordance with some embodiments.

Methods, systems, and computer readable mediums for ephemeral eventing are presented. For purposes of description and simplicity, methods, systems and computer readable media will be described for a content storage and management service, and in particular, content item event classification. However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described may be used for a variety of storage providers/services and types of content, files, portions of files, and/or other types of data.

In order to intelligently display content items on a local user device, an application executing on the content management system may categorize content items into events that include all content items associated with the same event. Verification that a content item belongs to a particular event may involve algorithms that analyze a content item's metadata. The metadata may include, for example, a geolocation, various timestamps (e.g., one or more creation timestamps, access timestamps, upload timestamps, and/or sharing timestamps), sharing data (e.g., with which users the content item was shared), access data (e.g., the number of users currently viewing the content item and/or the number of times the content item has been accessed, shared, and/or downloaded), a device_ID that identifies the user device, a local_ID that identifies the content item on the user device, and/or content features extracted from the content. To further distinguish events that occurred within the same time and space, such as, for example, Thanksgiving dinner and a football game at the yard across the street, metadata that identifies the faces, locales, landmarks, and/or printed time stamps depicted in the content items may also be analyzed.

Content item metadata, typically generated when the content item is created, may be sent to a content management system for immediate categorization. Because the size of the metadata portion of a typical content item is often very small, transmission of the metadata may be conducted over any suitable network connection available to the user device—even a network connection that is not suitable to easily handle transmission of the content portion of the content item. Similarly, eventing data received from the content management system, like the metadata, is often very small, and may be received over any suitable network connection.

Eventing data may incorporate several individual event attributes for describing the event and distinguishing the event from other events categorized on the content management system. Thus, the eventing data may include a unique event ID, an event name, an event timestamp, and/or various event tags that a user may find useful for viewing, sorting, organizing, and sharing their content items. One or more of these event attributes may be displayed along with the content items associated with the event in an "event view" user interface on the local user device.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 shows an exemplary system in accordance with various embodiments. System 100 may include user devices 102*a* and 102*b*, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102*a* and user device 102*b* (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 13.

Figure 2A:
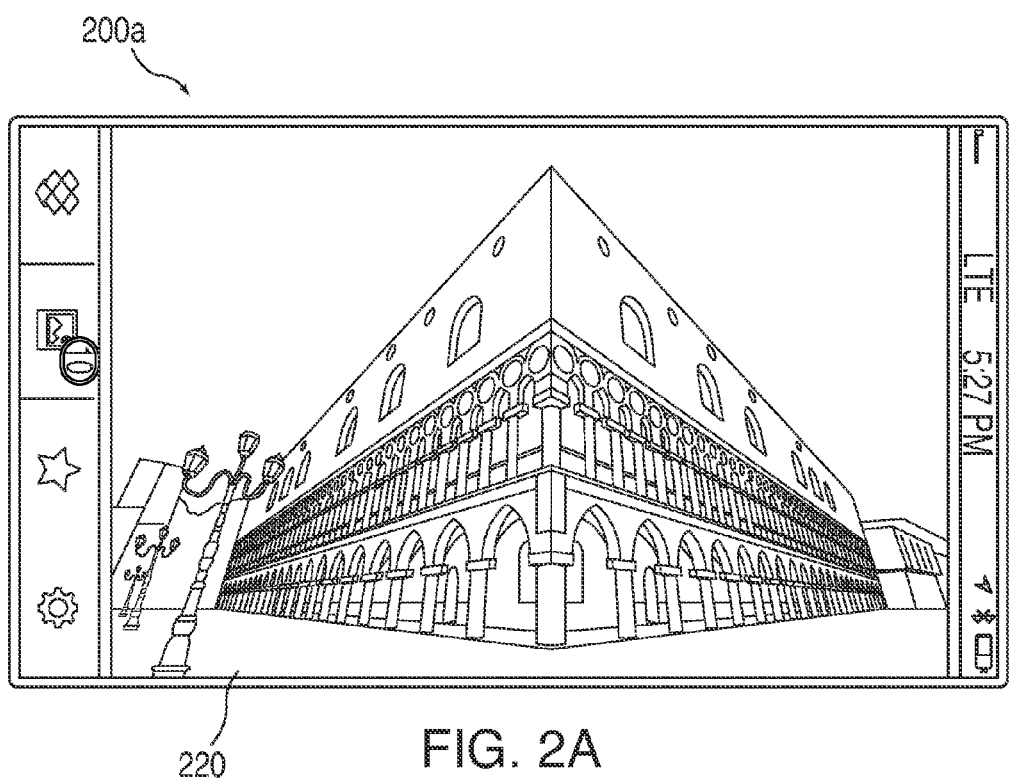
FIGS. 2A and 2B show a user interfaces for viewing content items in an event view, in accordance with some embodiments.
Figure 2B:
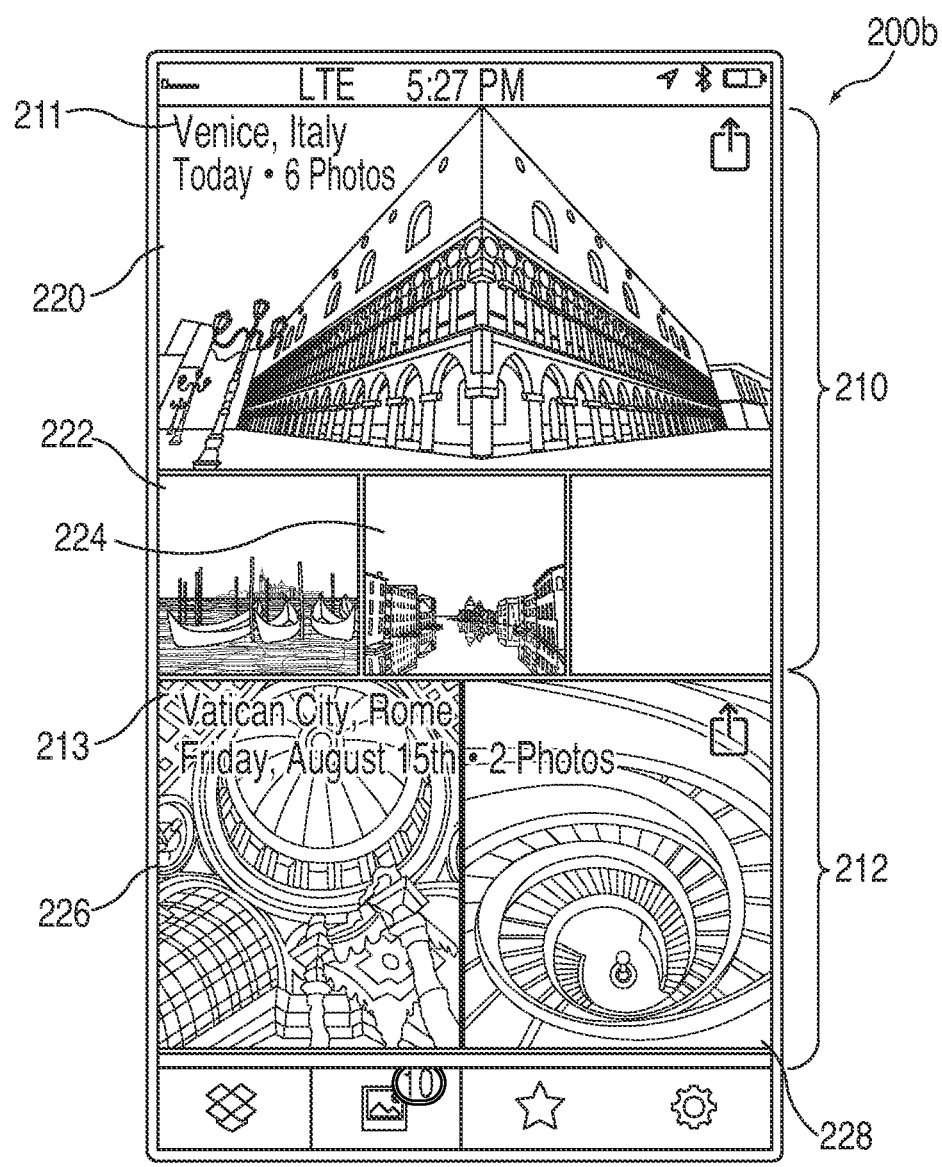

FIGS. 2A and 2B show user interfaces 200*a* and 200*b*, respectively, for viewing content items in an event view, in accordance with some embodiments. User interfaces 200*a* and 200*b* may be displayed on a display of an user device (e.g., user device 102*a* of FIG. 1) and may be generated using a content management application (e.g., content management application 114*a* of FIG. 1) and/or another application installed on the user device. In particular, user interface 200*a* may be generated by a camera application installed on the user device, and content item 220, displayed in user interface 200*a*, may have been recently captured using camera (e.g., camera 138a of FIG. 1). In some embodiments, the content management application may include image capturing functionality to permit facile navigation between an image-capturing user interface and an event view user interface as depicted in user interface 200b. However, it should be understood that the content management application need not include image-capturing functionality, and images captured using another image-capturing application may be imported into the content management application for viewing in an events view.

User interface 200b may illustrate an "events view" for viewing content items according to logically defined events. Events may be defined generally based upon geolocation data, timestamp data, and/or any other suitable identifying data associated with the content items. Such identifying data may be stored in a metadata portion of the content item and may be either generated automatically when the content item is created or entered/edited manually by a user. Processes for organizing content items into individual events are discussed below in detail with respect to FIGS. 7-9.

User interface 200b may include content items 220-228 organized and displayed according to events 210 and 212. In particular, content items 220, 222, and 224 are displayed within event 210 and content items 226 and 228 are displayed within event 212. Event captions 211 and 213 are displayed within, and describe, events 210 and 212, respectively. Event captions 211 and 213 may include any suitable event attributes that describe and/or define the event, including the event name, event timestamp, the number of content items associated with the event, etc. Event attributes may be derived, for example, from the metadata associated with the content item associated with the event, or from any other suitable source, as described in more detail below with respect to FIGS. 7 and 8.

In some embodiments, user interface 200b may be scrollable to facilitate browsing through the user's content items. The user may scroll through the various events and content items of user interface 200b by interacting with the user interface using gestures (e.g., swiping up/down) if user interface 200b is displayed on a touchscreen enabled device and/or using user interface features (e.g., scrollbars). Events in user interface 200b may be displayed in any suitable order, such as in chronological order, for example. In further embodiments, only one event may be displayed within a user interface at one time. In such embodiments, a user may be permitted to scroll through content items associated only with that particular event. Other events may be accessible by interacting with the user interface using gestures (e.g., swiping left/right) if the user interface is displayed on a touchscreen enabled device and/or using user interface features (e.g., navigable menus).

Content items 220-228 may be associated with event data and seamlessly displayed in the events view of user interface 200b before they are uploaded to a content management system (e.g., content management system 100 of FIG. 1). It should be understood that the term "seamless" as used herein may refer to an event occurring in an expedited time period. The expedited time period may be short enough that a human being may experience the event has having occurred immediately or with little noticeable delay. For example, in some circumstances, the user may not perceive any delay between generating a content item (e.g., capturing an image via a camera) or receiving a content item (e.g., via a sharing event) and experiencing the content item being displayed along with event data received from the content management system. Accordingly, the user may interact with the content items on the local user device as if they had already been uploaded to the content management system even if the user's user device has intermittent network connectivity and/or limited network connectivity.

Thus, in the exemplary embodiment shown in FIGS. 2A and 2B, if content item 220 represents an image that the user recently captured using a camera of the user device, a metadata portion of content item 220 may be sent to the content management system. The metadata may include, for example: a geolocation (e.g., latitude and longitude coordinates); various timestamps (e.g., timestamps based on a local clock of the user device or a timestamp that is synchronized with a trusted source, such as via the Network Time Protocol ("NTP")), such as one or more creation timestamps, access timestamps, upload timestamps, and/or sharing timestamps; sharing data (e.g., with which users the content item was shared); access data (e.g., the number of users currently viewing the content item and/or the number of times the content item has been accessed, shared, and/or downloaded); a device_ID that identifies the user device; a local_ID that identifies the content item on the user device; and/or content features extracted from the content item (e.g., potentially recognizable faces, landmarks, objects, printed timestamps, tags associated with the content item, etc.). Once the metadata is received at the content management system, one or more eventing algorithms can analyze the metadata, assign event data (e.g., an event_ID, an event name, an event location, an event timestamp, etc.) to the content item, and send the event data back to the user device. Upon receipt of the event data, content item 220 may be displayed in the events view of user interface 220b. Because the uploading of metadata and downloading of event data can take place almost instantaneously, even over a limited network connection, content item 220 may be seamlessly displayed along with its event data without the user perceiving any delay.

Figure 3:
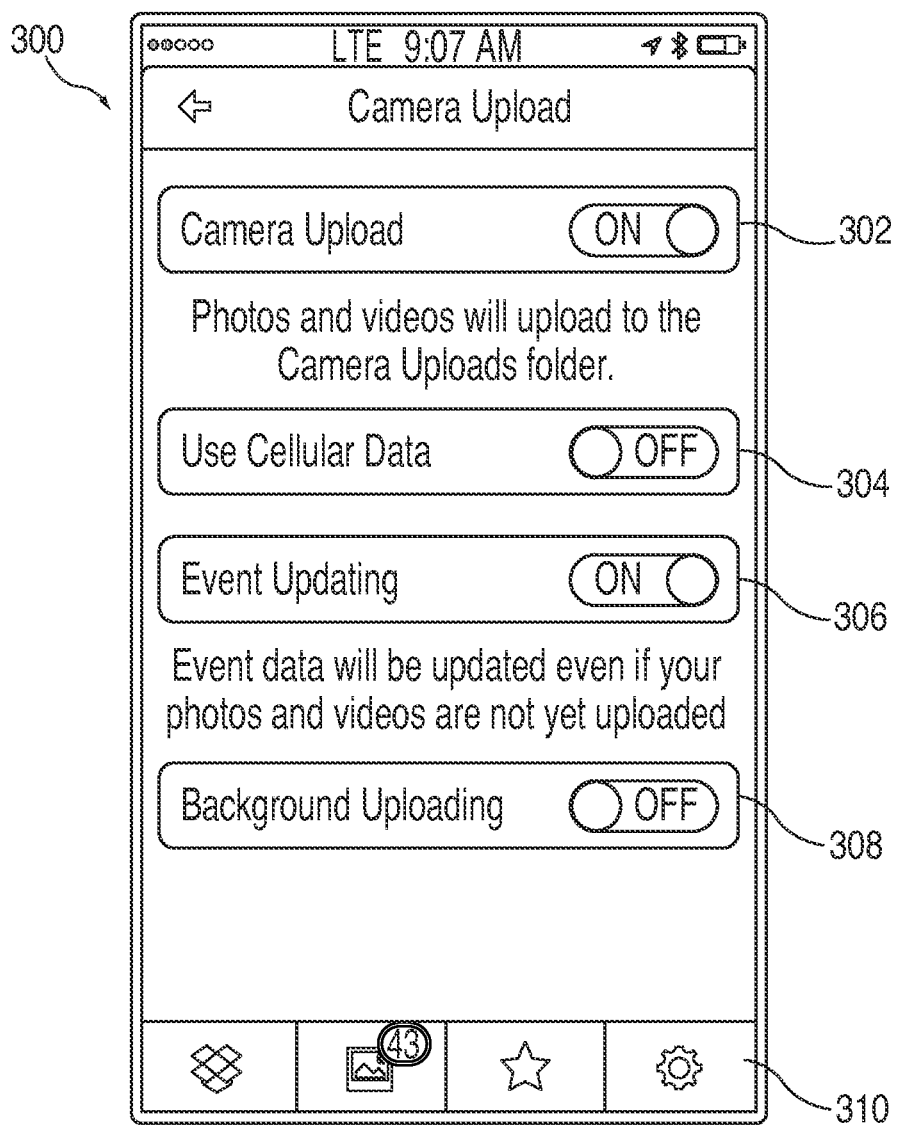
FIG. 3 shows a block diagram for executing ephemeral eventing, in accordance with some embodiments.

FIG. 3 shows user interface 300 for selecting options relating to ephemeral eventing, in accordance with some embodiments. User interface 300 displays various user-selectable camera upload options, including Camera Upload option 302, Use Cellular Data option 304, Event Updating option 306, and Background Uploading option 308. Options 302-308 may be accessible by accessing Settings option 310 within a content management application on an user device (e.g., content management application 114a of user device 102 of FIG. 1).

Camera Upload option 302 may allow a user to select whether or not photos and videos on the user device will be uploaded to a content management system (e.g., content management system 100 of FIG. 1). According to various embodiments, selecting Camera Upload option 302 may initiate automatic uploading of all photos and videos captured using a camera of the user device and/or all photos and videos shared to the user device (e.g., via e-mail, the content management system, SMS, MMS, a third-party social networking system, etc.) or otherwise obtained by the user device (e.g., via an Internet download). Uploading content items like photos and videos to the content management system may be beneficial for both providing backups of the content items and enabling content management functionalities available via the content management system.

Use Cellular Data option 304 may allow a user to select whether or not photos and videos will be uploaded to the content management system via a cellular networking connection available to the user device. Such cellular networking connections may include EDGE, 3G and LTE services, for example. If Use Cellular Data option 304 is enabled, photos and/or videos may be automatically or manually uploaded to the content management system over a cellular data connection available to the user device. However, because cellular service providers often charge premiums for exceeding data quotas over cellular networks, and cellular networks tend to be slower than other network connections (e.g., Ethernet and WiFi), it may be ill advised to allow automatic uploading of potentially thousands of large content items over a cellular data connection. Accordingly, if Use Cellular Data option 304 is disabled, the user device may wait until a non-cellular network connection, such as Ethernet or WiFi, is available before uploading content items to the content management system.

Event Updating option 306 may allow a user to select whether or not eventing data for content items that are queued to be uploaded to the content management system may be updated even if the content items have not yet been uploaded. If Event Updating option 306 is enabled, therefore, metadata associated with the content items may be sent to the content management system and eventing data may be received from the content management system even if the content items have yet to be uploaded. In some cases, the eventing data can be updated even if the only network connection available to the user device is a cellular data connection. Because the metadata portion of a content item may be orders of magnitude smaller than the content portion of the content item, sending only the metadata portion of the content item over a cellular network connection poses fewer downsides as compared with sending the full content item. For example, Exif, a typical metadata standard for use with JPEG images, limits the metadata to 64 kB, while the content portion of a JPEG may be several MB in size. The issue is even more dramatic in the case of video files which may be tens or hundreds of GB in size.

Activating Event Updating option 306 may provide benefits to the user whether or not Use Cellular Data option 304 is enabled. If Use Cellular Data option 304 is disabled, the metadata portions of queued content items may be uploaded while the user device waits for a suitable non-cellular network connection for sending the content portions. On the other hand, if Use Cellular Data option 304 and Event Updating option 306 are both enabled, the metadata portions of the queued content items may be uploaded separately from the content portions. In some embodiments, the metadata portions may be prioritized so that eventing data may be received from the content management system as soon as possible and before using any network bandwidth to upload the much larger content portions of the content items. It should be recognized that upload prioritization of the metadata portions over the content portions of content items may also be used even if a suitable non-cellular network connection is available.

Background Uploading option 308 may allow a user to select whether or not content items will be uploaded to the content management system without explicitly invoking the content management application on the user device. If Background Uploading option 308 is enabled, the user device may automatically upload queued content items to the content management system whenever a suitable network connection is recognized. For example, if Use Cellular Data option 304 is disabled, the user device may begin to upload queued content items to the content management system upon the user device connecting to a suitable non-cellular network connection. If Use Cellular Data option 304 is enabled, the user device may upload queued content items whenever the user device is connected to any network connection, including a cellular data connection, and even when the content management application is not actively running on the user device.

According to some embodiments, options 302-308 may not be user selectable. Rather, the content management application may either lock one or more of options 302-308 into default selections or allow one or more of options 302-308 to be automatically selected based on, for example, the type of user device (e.g., smartphone, tablet, laptop computer, desktop computer, etc.) on which the content management application is installed and/or a level of service associated with the user's account with the content management system (e.g., basic, enhanced, business, etc.).

Figure 4:
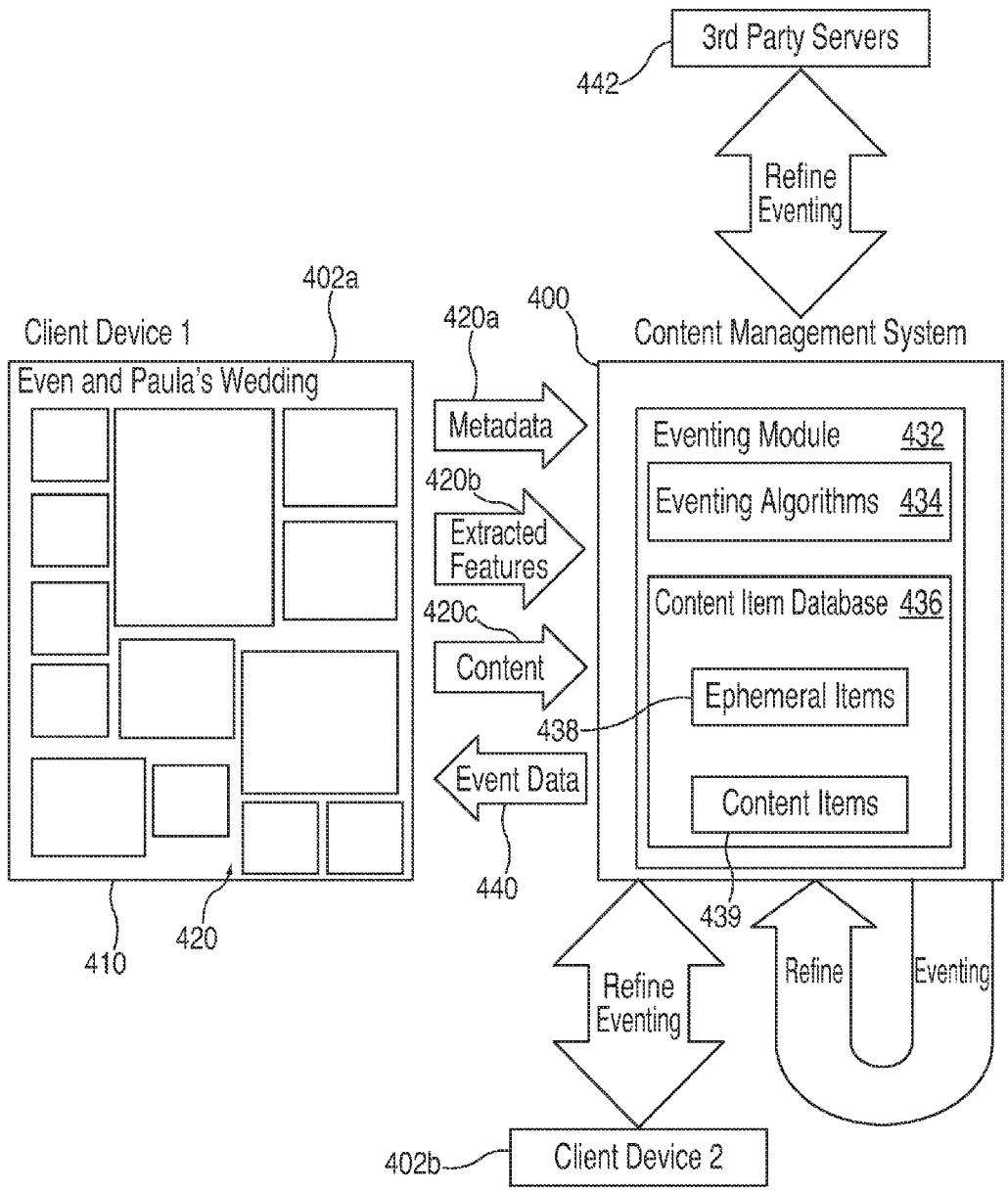
FIG. 4 shows a portion of an illustrative content item database for ephemeral eventing, in accordance with some embodiments.

FIG. 4 shows a high-level block diagram of an exemplary content management system 400 offering ephemeral eventing capabilities, in accordance with some embodiments of the invention. In particular, the system of FIG. 4 may include content management system 400 connected to user device 402a and user device 402b over a network connection, which may correspond to content management system 100, user devices 102, and network 106 of FIG. 1, respectively. Further, content management system 400 may communicate with one or more third-party servers over the network connection.

User device 402a may display content items (generally referred to as content items 420) within user interface 410 using an events view. User interface 410 and content items 420 may correspond, for example, to user interface 200b and content items 220-228 of FIG. 2. Content items 420 may represent content items that are resident on user device 420a and may be queued for uploading to content management system 400.

Different portions of content items 420 may be transferred to content management system 400 separately. Accordingly, metadata portions 420a may be uploaded separately from both extracted features 420b and content portions 420c. When and how the different portions of content items 420 are uploaded to content management system 400 may depend on both network conditions and user-selected options (e.g., options 302-308 of FIG. 3). As just one example, metadata 420a and extracted features 420b may be sent to content management system 400 as soon as any network connection is available to the user device, while content 420c may only be sent upon both the user invoking the content management application on the user device and a broadband network connection being available to the user device.

Portions 420a-420c may be received at an interface module (e.g., interface module 104 of FIG. 1) of content management system 400 and transferred to an eventing module 432. Eventing module 432 may include a content item database 436 and software that may implement eventing algorithms 434 that organize ephemeral items 438 and content items 439 stored in content item database 436 into logically defined events. As used herein, the term "ephemeral item" may refer to an incomplete version of a content item that is stored in a memory (e.g., data store 118 of FIG. 1) of a content management system. The ephemeral item may be considered incomplete, for example, when it is not associated with a content portion of the content item stored in the memory. That is, an ephemeral item may only include metadata 420a and/or extracted features 420b associated with a content item that is queued for uploading on user device 402a. As used herein, the term "content item" may refer to a full version of a content-related file (e.g., an image, a video, an audio file, a document, etc.) that includes both the content portion and the metadata portion. Ephemeral items may be used as placeholders that enable the content management system to perform at least some content management functionalities (e.g., eventing) prior to receipt of the full content item.

After one or more eventing algorithms are run on ephemeral items 438 and/or content items 439 stored in content item database 436, event data generated by eventing module 432 may be sent to user device 402a to enable the viewing of content items 420 in user interface 410, which may represent an events view user interface. Event data 440 may be transferred to user device 402a at any time after at least a portion of event data 440 is generated or altered by an eventing algorithm. For example, after receipt of metadata 420a, eventing module 432 may generate and send at least one event attribute back to user device 402a. Examples of event attributes may include a unique event_ID that identifies the event on both content management system 400 and user device 402a, an event name, an event timestamp, the number of content items currently associated with the event, and/or various event tags that a user may find useful for viewing, sorting, organizing, and sharing content items.

According to some embodiments, event attributes may be refined as content management system 400 collects additional data about the event. The additional data may be derived from various sources, including: other content items and/or events already stored on the content management system; similar content items and/or events stored on a second user device 402b, which may or may not be associated with the same user account as user device 402a; similar content items/events stored on third-party servers; similar events discussed in a news outlet; similar events that match one or more calendar entries; shared content items that match the event; and/or features extracted from content items matching the event. Each time the eventing module 432 refines an event's event attributes, the event data may be sent to user device 402a. In some embodiments, a user may be permitted to lock an event to prevent further refinement of event attributes with respect to how the event is defined on user device 402a.

FIG. 5 shows a portion of an exemplary content item database 500 for ephemeral eventing, in accordance with some embodiments. Content item database 500, which may correspond to content item database 436 of FIG. 4, may include various data fields for creating associating event data with ephemeral items and content items. In particular, content item database 500 may include: a user_account_ID field 502; a local_ID field 504; a global_ID field 506, a content_item_address field 508; descriptive metadata fields 510a-510n; an event_ID field 512, and event attribute fields 514a-514n.

When a metadata portion (e.g., metadata 420a of FIG. 4) of a content item is received at the content management system, the eventing module may compare the metadata portion with data already stored in content item database 500. For example, the eventing module may compare one or more metadata entries (e.g., a user_account_ID, a local_ID, and or a timestamp) with metadata entries already stored in content item database 500 to determine whether an ephemeral item or content item associated with the metadata is already stored in content item database 500. If the comparison indicates that an ephemeral item or content item is already stored in content item database 500 the eventing module may incorporate any additional data received with the metadata portion into the corresponding entry. If no new data is received, the metadata portion may be ignored by the eventing module. For example, an additional set of metadata, including a user_account_ID, local_ID, timestamp, and geolocation may be uploaded with an initial metadata upload associate with a particular content item stored on a user device. In time, more metadata may be associated with the content item, and that metadata may be used to fill in empty fields in content item database 500. It should be understood that descriptive metadata fields 510a-510n may represent any number of metadata fields representing any type of metadata associated with the corresponding content item.

If the eventing module determines that no ephemeral item or content item is already associated with the received metadata portion, a new ephemeral item may be created. Creating the new ephemeral item may include creating a new entry in content item database 500 and populating the database fields with any suitable data received with the metadata portion. Thus, in one particular example, upon receipt of a metadata portion, row 2 of content item database 500 may be populated with: user_account_ID=Lisa_Lorentz; Local_ID=YD82V23H; Timestamp=2013-10-30 T 22:42 UTC; and Geolocation=37.763236, −122.404642. The entry created in row 2 may be considered an ephemeral item because it is not yet associated with a content portion stored in a memory of the content management system. In contrast, the entry created in row 1 may be considered a content item because it is associated with its content portion (by reference to its physical or logical address) that is stored in a memory the content management system.

Once an ephemeral item or content item has been created, the eventing module can analyze the received metadata portion for the item and generate eventing data. The eventing data can include an event_ID field 512 and any number of event attribute fields 514a-514n. For example, continuing with the entry of row 2, the eventing module populated the event-related fields with: event_ID=DT38X31R and event_name=Even and Paula's Wedding. The event-related fields can then be compiled into eventing data for transmission back to the user device for immediate rendering of the associated content item within an events view user interface. Thus, the content item stored on the user device and associated with row 2 can be displayed in an events view showing that the content item is related with Even and Paula's Wedding. Further event attribute fields 514a-514n may be populated as more data is received from various sources inside and outside of the content management system, and as those additional fields are populated, the updated or refined eventing data may be sent to the user device for further enriching the events view.

Once the content portion of a content item is uploaded to the content management system, the ephemeral item defined in content item database 500 may be converted to a content item. Converting an ephemeral item to a content item may include populating a global_ID field and an address field. The global_ID field may represent a unique identifier for the content item on the content management system. After the global_ID is assigned, it may be sent to the user device such that all future correspondence between the user device and the content management system regarding that content item can be conducted with reference to the global_ID. Assigning each content item a unique global_ID may assist the content management system in carrying out eventing, sharing, editing, and other functionalities. The address field may simply reflect the physical or logical address in memory where the content item is actually stored.

Figure 6:
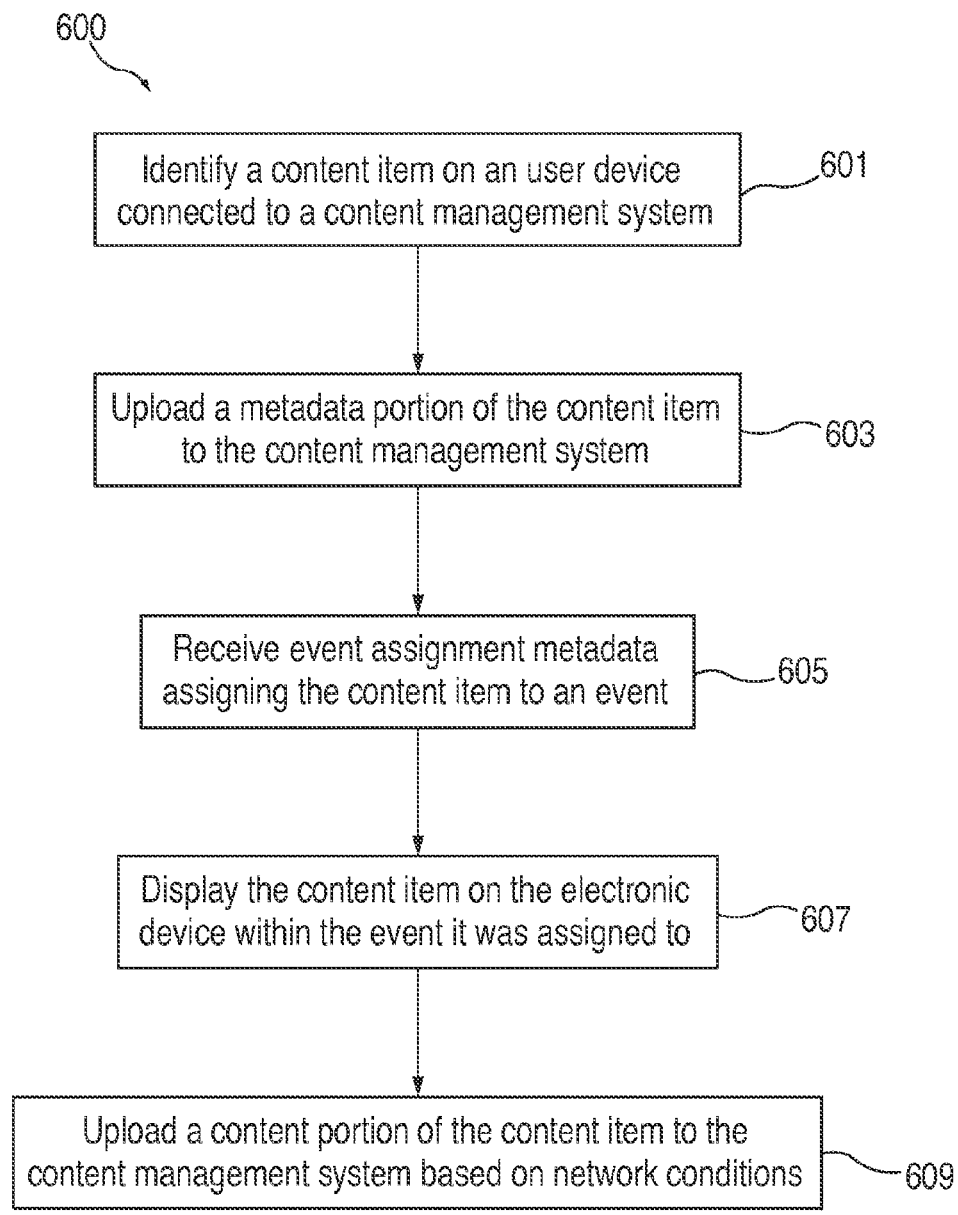

FIG. 6 shows a flowchart of an illustrative process 600 for ephemeral eventing, in accordance with some embodiments. Process 600 may begin at step 601, in which a content item (e.g., content item 220 of FIG. 2) on an user device (e.g., user device 102a of FIG. 1) connected to a content management system (e.g., content management system 100 of FIG. 1) may be identified. The identified content item may be a content item that is queued for uploading to the content management system or a content item that may be queued for uploading in the future. For example, a content management application installed on the user device may give the user the option (e.g., via Camera Upload option 302 of FIG. 3) to automatically upload content items captured with and/or shared with the user device. If such an option is selected, content items may be queued for upload as soon as they are received and, therefore, may be identified at the same time. If such an option is not selected, the user may manually identify content items. The content item may be any content-related file that includes both a content portion and a metadata portion, such as an image, a video, an audio file, or a document, for example.

At step 603, a metadata portion of the identified content item may be uploaded to the content management system. Uploading the metadata portion may include sending the metadata portion over a network connection between the user device and the content management system. The network connection may be any connection suitable for transferring at least small amounts of data. If no suitable network connection exists, the metadata portion may be queued for uploading until such a time that a suitable network connection does exist. In some embodiments, queued metadata portions may be aggregated for bulk transfer between the user device and the content management system.

At step 605, the user device may receive eventing data that assigns the content item to an event. As described above, an event may represent a logical set of content items. Thus, referring to FIG. 5, an event might be assigned for all content items associated with "Even & Paula's Wedding" or "Dinner at Marlowe." The eventing data received at the user device may include a unique event_ID that identifies the event separately from other events defined on the content management system. If, during refinement of the eventing data, the eventing module determines that two unique event_IDs refer to the same event, the event_IDs may be merged, and event attributes associated with the merged event_IDs may be merged and/or combined according to eventing algorithms used by the eventing module.

At step 607, the content item may be displayed on the user device within the event to which it was assigned. Thus, if the user views the content item in a user interface with an events view (e.g., user interface 200b of FIG. 2), the content item may be displayed along with other content items assigned to the same event, and at least some eventing data received from the content management system may be displayed to the user. The user may be permitted to view the content item in the events view even before the content item itself is uploaded to the content management system using the metadata upload/event data download steps. Because metadata and event data may be sent quickly, even over a relatively slow network connection, the user may perceive seamless integration of the content item into the events view. In some embodiments, the content item may be capable of being displayed in the events view within a time period that appears seamless to a user of the user device (e.g., less than 100 ms, less than 1 s, or less than 10 s).

At step 609, the content portion of the content item may be uploaded to the content management system. Scheduling of the upload of the content portion may be dependent on network conditions available to the user device. For example, the content portion may be queued for uploading until a high-speed network signal (e.g., WiFi) is available. Further, scheduling of the upload may depend on the size and/or type of content in the content portion. For example, the user device may upload the content portion of a document with only access to a cellular data signal, while requiring that a high-speed network signal be present for uploading images or videos.

Figure 7:
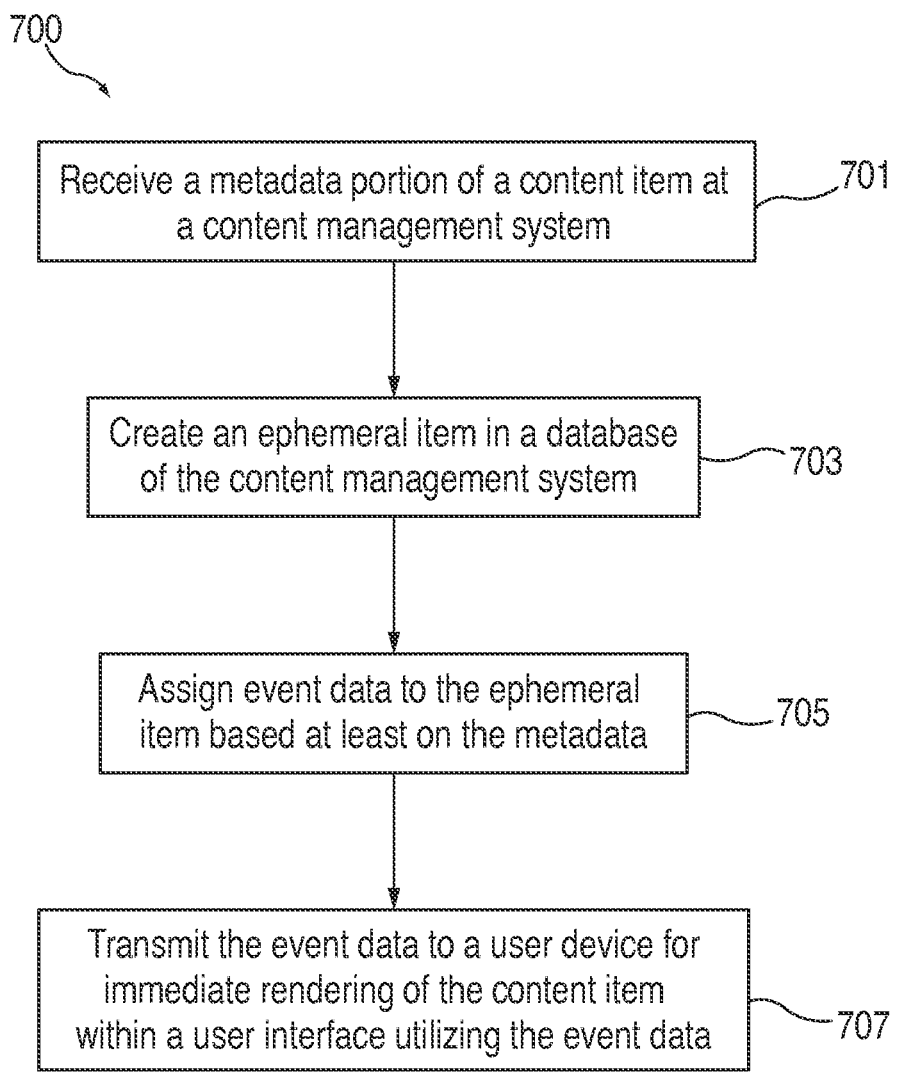

FIG. 7 shows a flowchart of an illustrative process 700 for ephemeral eventing, in accordance with some embodiments. Process 700 may begin at step 701, in which a content management system may receive a metadata portion of a content item from a user device. The metadata portion may include, for example, creation time timestamp, geolocation, orientation, rotation, title, and/or any other attributes or data relevant to the content item. In some embodiments, the metadata portion may be received at an interface module (e.g., interface module 104 of FIG. 1) of the content management system and transferred to an eventing module (e.g., eventing module 430 of FIG. 4) of the content management system.

At step 703, the eventing module may create an ephemeral item entry in a content item database. When first created, fields of the database representing the ephemeral item entry may be populated with all or a portion of the metadata portion received from the user device (e.g., a user_account_ID, a local_ID, a timestamp, and a geolocation). An ephemeral item entry may be a temporary database entry, which may be replaced when and if a corresponding content portion is uploaded to the content management system.

Once the ephemeral item entry is created, the eventing module may assign event data to the ephemeral item entry based at least on the metadata portion at step 705. Assigning event data to the ephemeral item entry may include running at least one eventing algorithm on data included within the metadata portion. The eventing algorithm may assign event data to the ephemeral item in order to group the ephemeral item into an event, or a logical set. The event may include, for example, all content items (and ephemeral items) associated with a particular time and/or location range.

At step 707, the content management system may send the event data to a user device (e.g., user device 102a of FIG. 1) for expedited rendering of the content item within a user interface utilizing the event data. The event data may be sent over any suitable network (e.g., network 106 of FIG. 1) and over any suitable network connection (e.g., a cellular data connection, a WiFi connection, or an Ethernet connection). Because the reception of the metadata portion, creation of the ephemeral item, assignment of the event data, and transmission of the event data may be completed very quickly, a user of the user device may view the content item within the user interface utilizing the event data in a manner that appears instantaneous. Thus, a user of the user device may perceive that the user device is seamlessly interconnected with the content management system even if content items resident on the user device have not yet been uploaded to the content management system.

Figure 8:
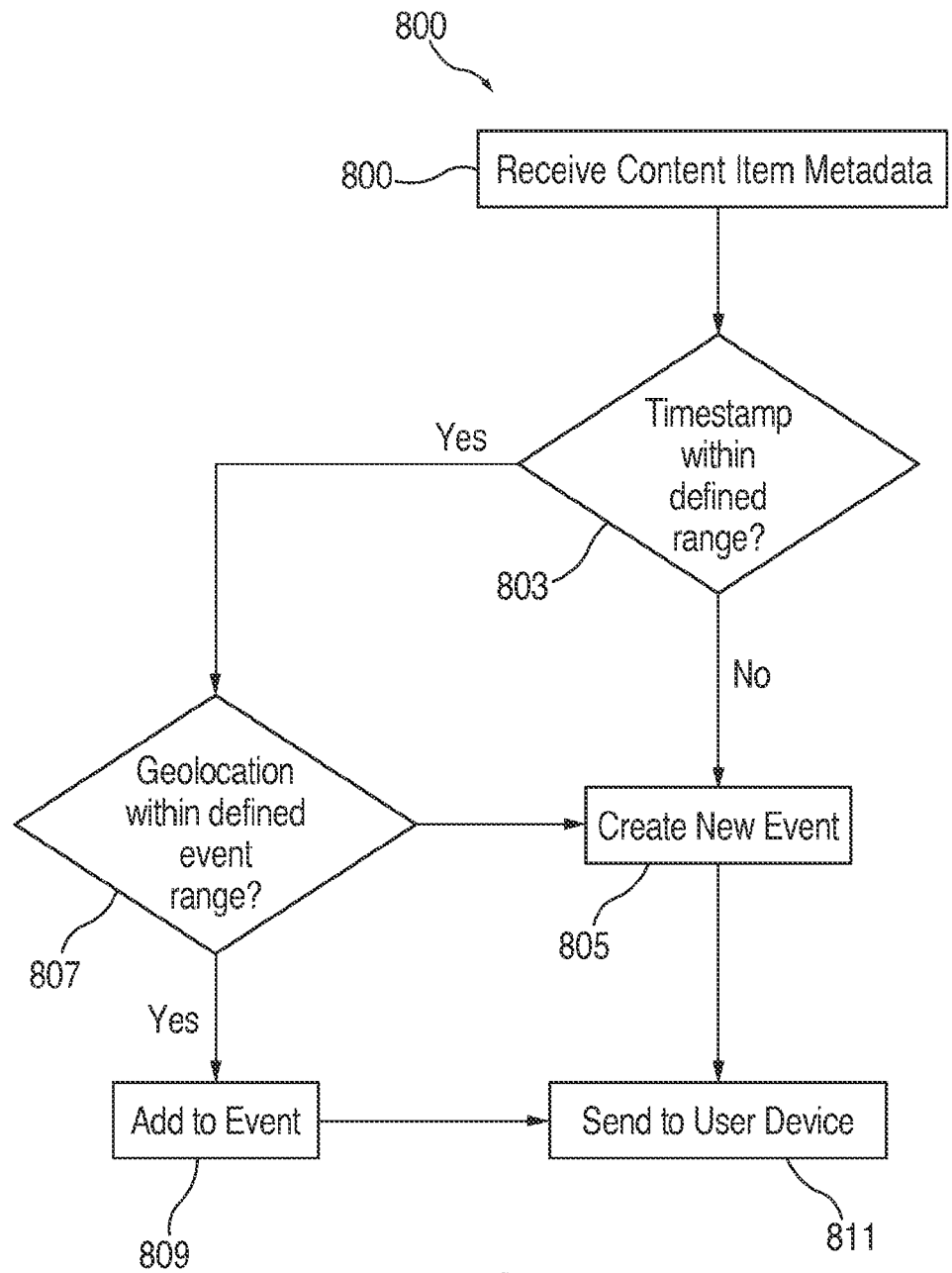

FIG. 8 shows an illustrative process 800 for providing event data to a user device, in accordance with some embodiments. Process 800 may begin at step 801, in which a module of a content management system (e.g., eventing module 432 of FIG. 4) may receive metadata, including geolocation data and timestamp data, from a user device. The geolocation data may have been received as part of a metadata portion of a content item as described above. The content management system may then assign event data to the content item based at least on the geolocation data and the timestamp data as described below.

At step 803, the eventing module may parse a content item database (e.g., content item database content item database 500 of FIG. 5) for database entries with timestamp data within an event time period of the timestamp data. The event time period may be a content management system defined time period extending from the most recent timestamp associated with a content item or ephemeral item already associated with the event. Thus, if the defined time period is one hour, the event time period for the event may extend one hour beyond the most recent timestamp associated with a content item associated with the event.

If, the timestamp data is within the event time period, process 800 may continue to step 805, in which the eventing module may determine whether or not the geolocation data is within a defined range from an event geolocation associated with the event. Because two content items generated close to one another in time but at different locations may be best categorized as belonging to two separate events, the eventing module may categorize a content item generated a defined distance away from other content items associated with the event into a second event. For example, consider two images generated by a user device (e.g., user device 102a of FIG. 1) within a short time period of one another (e.g., 30 min). If the geolocation data indicates that the first image was generated at an office building and the second image was generated at a ballgame some distance (e.g., 5 miles) from the office building, the content management system may conclude that the images belong to different events.

If either the timestamp data or the geolocation data indicate that the content item should be assigned to a new event, the content management system may create a new event at step 805. Creating a new event may include generating an ephemeral item entry in the content management database that includes at least a portion the metadata (e.g., a local ID, user account information, the geolocation data, the timestamp data, and/or any other suitable metadata) and no other data already extant on the content management system. On the other hand, if the timestamp is within the event time period of the timestamp data and the geolocation data is within the defined range, after creating the ephemeral item entry, the eventing module may add the ephemeral item to the event by populating at least one event attribute field of the entry (e.g., at least an event ID field) with data already extant in the database associated with the event at step 809.

At step 811, the content management system may send the event data to the user device. As described above, the content management system may send the event data to the user device prior to receiving a content portion of the content item. In this manner, a user may be permitted to view the content item in an events view on the user device without perceiving any delay between generating and so viewing the content item.

Figure 9:
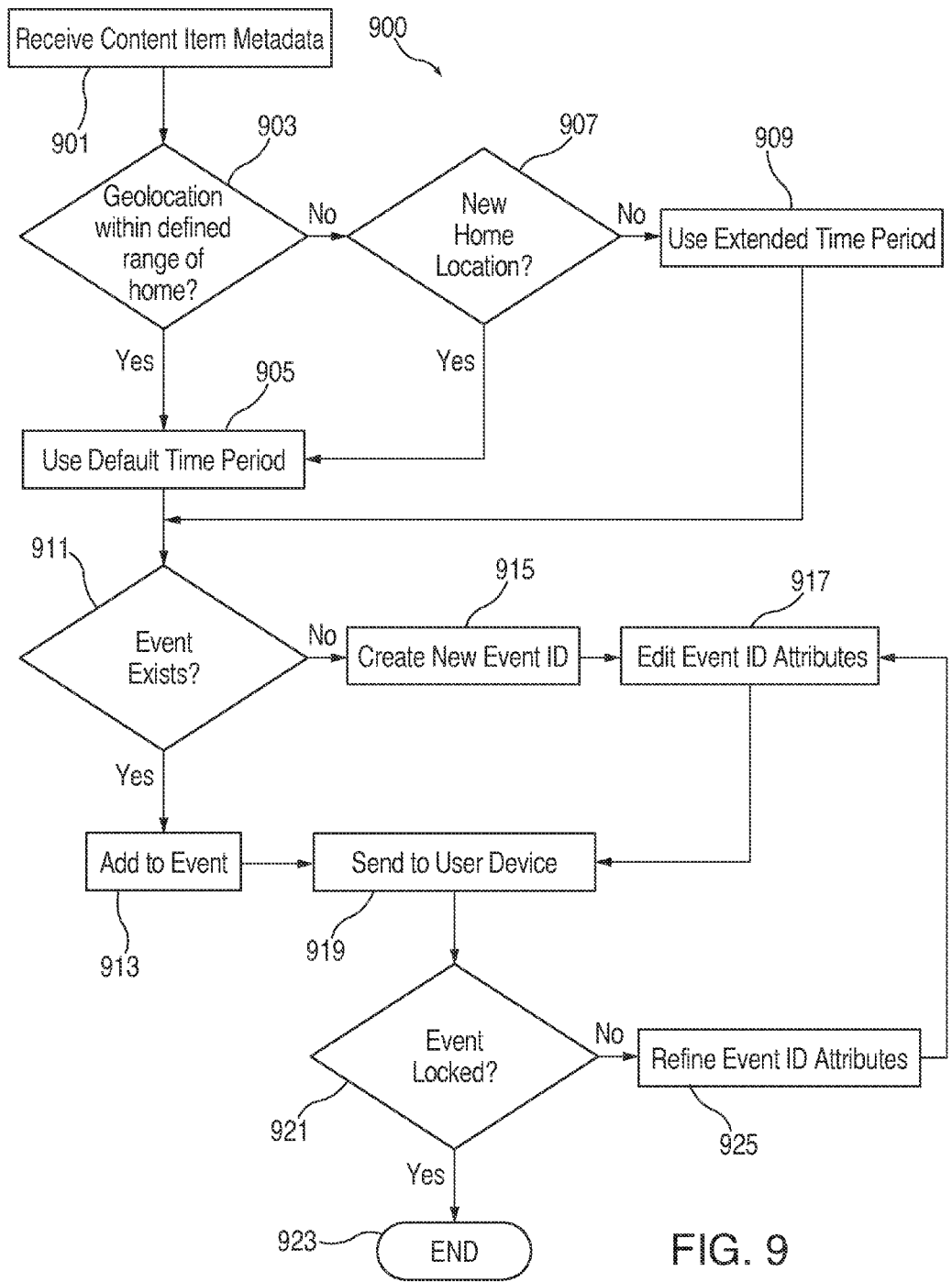

FIG. 9 shows an illustrative process 900 for providing event data to a user device, in accordance with some embodiments. Process 900 may begin at step 901, in which a module of a content management system (e.g., eventing module 432 of FIG. 4) may receive metadata, including geolocation data and timestamp data, from a user device. The geolocation data may have been received as part of a metadata portion of a content item as described above. That is, the geolocation data may be used for ephemeral eventing in accordance with some embodiments. The geolocation data may any suitable data (e.g., country, region, city, postal/zip code, latitude, longitude, and/or time zone) for representing a location associated with the content item. The geolocation data may be derived from any suitable source, including a location associated with an Internet Protocol (IP) address and/or MAC address associated with an user device that generated the content item, a location determined using WiFi positioning system or GPS system, or user-disclosed location information.

At step 903, the eventing module may determine whether the geolocation is within a defined range of home. The user's home location may be defined using any suitable method, such as using a user-provided address or using an algorithm run by the content management system that may determine the user's home location by analyzing a number of factors, including the location where a user device associated with the account is located at night. Further, the content management system may define more than one "home" location for a user, such that other places that the user spends a lot of time (e.g., work) are considered home locations as well. The defined range of home may also be user or system defined. Thus, the content management system may define the range as a range within which the user spends a large proportion of time (e.g., 95% or more), or the user may define the range (e.g., within 5 miles).

If it is determined that the geolocation of the content item is within a defined range of home, the eventing module may use a default time period for assigning eventing data to the content item at step 905. In some embodiments, the default time period may be defined as a time period starting from receipt of metadata associated a first content item with geolocation data within a defined range (e.g., 0.25 miles) and extending for a predefined period of time (e.g., one hour). In other embodiments, the default time period may be defined as a time period starting from receipt of metadata associated a first content item with geolocation data within a defined range and continuing as long as additional content items are received within a predefined period of time (e.g., 1 hour). Using a default time period for content items with geolocation metadata indicating that they are associated with a location within a defined range of home may be appropriate because single events that take place close to home (e.g., dinner or a movie) may generally be better conceptualized as taking place over a short period of time. On the other hand, events that take place far from home (e.g., a trip to Europe) may be best conceptualized over a long period of time such that all content items associated with the event far from home are organized into one event instead of being organized into a series of disjointed events.

If the geolocation is not within a defined range of home, the content management system may determine whether the content item is associated with a new home location at step 907. The determination may be made using a pattern of geolocation data associated with content items generated from a user device and/or input received from the user. For example, if the content management system detects a change in the pattern of geolocation data received, a query may be provided to the user device to determine whether the user has a new home location. If the geolocation is associated with a new home location, process 900 may continue to step 905 and implement the default time period. However, if the geolocation is not associated with a new home location, process 900 may continue to step 909 at which an extended time period may be applied to the content item. As discussed above, the extended time period may be longer than the default time period such that content items associated with a location far from home are grouped together in one logical event.

At step 911, the content management system may determine whether an event already exists that matches the geolocation data and timestamp data associated with the content item. Determining that a matching event exists may include determining that the timestamp data associated with the content item is within the event time period of an already existing event. According to some embodiments, the event time period of an already existing event may be defined as extending for a time period equal to either the default time period or extended time period, as appropriate, from the most recent timestamp associated with a content item already associated with the event. For example, if the default time period (e.g., one hour) applies for categorizing a content item, that content item will be assigned to an already existing event if the most recent timestamp of a content item in that event indicates that it was generated less than one hour prior.

Additionally, the content item may require that the geolocation data is within a defined range from an event geolocation associated with the event. In particular, the content management system may search through a database that includes event data (e.g., content item database 500 of FIG. 5) to determine whether an event matching the received geolocation and timestamp data already exists. The event geolocation may represent, for example, an average location for content items associated with the event. The defined range from the event geolocation may vary depending on whether the geolocation indicates that the content item was generated within a defined range of home or not. That is, for geolocation data that is outside the user's home area, the defined event geolocation range may be larger than if the geolocation data indicates that the content item was generated within the user's home area. In some embodiments, the event geolocation range may vary as a function of the distance from the user's home location. In one example, the content management system may assign the content item to a new event, even if the content item was generated within the event time period if the geolocation data indicates that the content item was generated outside of the event geolocation.

If the event already exists, the event data associated with that event may be associated with the content item associated with the geolocation and timestamp data at step 913. Associating the event data may include, as described above with respect to FIG. 7, creating an ephemeral item entry in the content item database using metadata associated with the content item, including the geolocation and timestamp data, and populating event attribute fields with data already extant in the database associated with the event.

If the event does not already exist, the content management system can create a new event ID at step 915. Creating the new event ID may include populating an event_ID field of the database with a unique identifier that identifies the event. At step 917, the content management system may edit event attributes associated with the event with any suitable available data. For example, event attribute fields associated with the location and time of the event may be updated based on the geolocation and timestamp data associated with the content item. Other event attribute fields (e.g., the event name, the number of content items associated with the event, names and/or faces of people associated with the event, the user device used to generate the content items associated with the event, etc.) may also be populated if such data is included with the metadata portion received at the content management system.

Whether the event already existed or the event was just created, the event data may be sent to the user device at step 919. The event data may be used on the user device for expedited rendering of the content item in an events view user interface (e.g., user interface 200*b* of FIG. 2). In some cases, the rendering in an events view can be immediate and/or appear seamless to the user of the user device.

At step 921, the content management system may determine whether the event is locked. If the event is locked, process 900 may end at step 923. An event may be locked, for example, if the user manually locks the event such that no additional event data can be associated with the event or if a predefined period of time passes (e.g., 2 years) since the event was last updated.

If the event is not locked, event data may be refined at step 925. Refining event data may include incorporating additional data acquired by the content management system about a particular event. The additional data may be received from any number of sources, including additional content items received from the user device, additional content items associated with other user accounts registered with the content management system, content items that were shared with the user, additional content items located on third-party servers (e.g., third-party servers associated with social networking applications or search-engine accessible Internet webpages), information derived from news stories associated with the event, and/or features extracted from the content item (e.g., faces, landmarks, objects, etc.) that match features previously recognized by the content management system. After the event data is refined, process 900 may return to step 917 to edit the event data. The event data may be updated for every content item associated with the event or a subset of content items associated with the event.

Steps 921, 925, 917, and 919 may be repeated (e.g., continuously, periodically, and/or upon receiving new data at the content management system) as long as the event is not locked.

Figure 10:
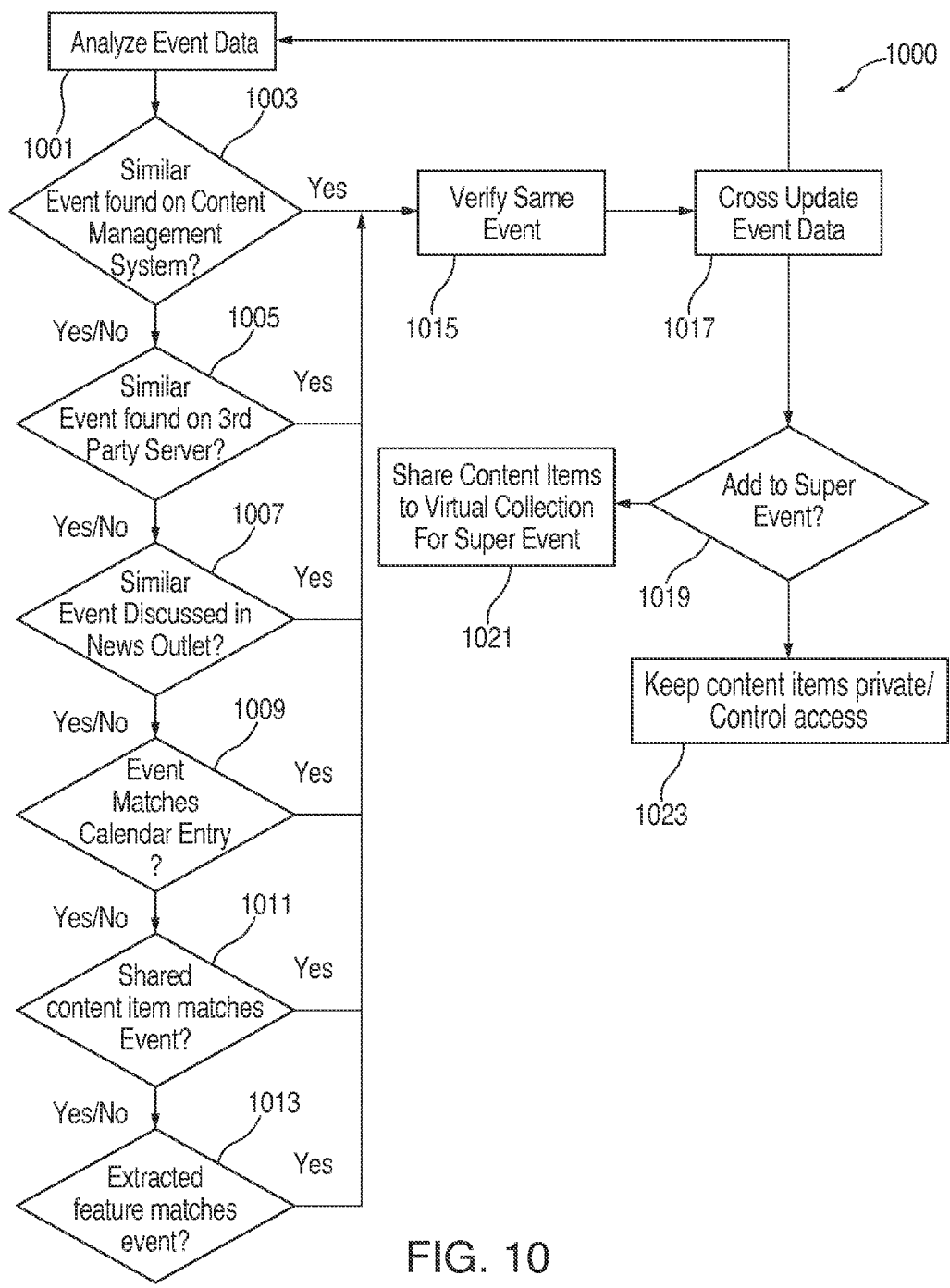

FIG. 10 shows a flowchart of an illustrative process 1000 for refining event data, in accordance with some embodiments. In particular, process 1000 may be used to update and/or refine event data by searching event data sources for data that may be used to augment or change data associated with a particular event. Process 1000 may begin at step 1001, in which an eventing module of a content management system (e.g., eventing module 432 of FIG. 4) may analyze event data associated with a content item or an ephemeral content item stored in a content item database (e.g., content item database 436 of FIG. 4). Analyzing the event data may include parsing, for a particular event, event attributes (e.g., event_ID, event name, event geolocation, event timestamp) and defining search terms based on those event attributes.

At step 1003, the eventing module may determine whether a similar event is found on the content management system. In some embodiments, the eventing module may search using the search terms generated in step 1001 for similar event data associated with content items stored for the user's account on the content management system. Thus, events that were defined separately for content items associated with the user's account may be consolidated using process 1000. Consolidating an event using event data associated with content items stored for the user's account may include choosing a single event ID, event name, event timestamp, and event geolocation for all content items/ephemeral items that are to be consolidated.

As one example, if a user takes a multi-city trip to Europe, content items associated with the different cities and/or content items associated with different time periods spent in the same city may originally be assigned to different events. At step 1003, the eventing module may determine that these various events should be consolidated. Thus, a single event ID may be associated with all content items to be consolidated, a single event name may be generated to reflect the consolidated event (e.g., "Europe Trip" instead of "Milan"), and the timestamp and geolocation fields may be updated to reflect that the event took place over a longer time period and over a larger geographical area than the originally-defined unconsolidated events. It should be recognized that single events might also be split into different events.

In some embodiments, the originally defined event data may be retained as sub events. Thus, in the example discussed above, all content items associated with the Europe Trip event may also be associated with a sub-event that more particularly defines the event. Such sub-events may be defined with any suitable level of granularity (e.g., using the "default" time period, using a special "trip sub-event time period," and/or by simply retaining originally defined eventing data).

In some embodiments, the eventing module may search, using the search terms generated in step 1001, for similar events defined for content items/ephemeral items stored primarily with respect to another user account registered with the content management system. Accordingly, the eventing module may search outside of the user's own content items/ephemeral items to find similar events defined on the content management system. Finding similar events defined on the content management system may include comparing the search terms generated in step 1001 with event data defined with another user's content items/ephemeral items.

Whether or not the eventing module finds a similar event on the content management system, the eventing module may determine whether a similar event is found on a third-party server at step 1005. Any third-party server accessible to the content management system may be searched to find one or more similar events. The third-party server may be the server of a social networking site, a file sharing site, or any other site that may arrange content items into logical groups, such as events or albums, for example. In some embodiments, the user may provide the content management system with credentials to access one or more third-party servers to facilitate sharing of information and robust eventing within the content management system.

The eventing module may then determine whether a similar event has been discussed in a news service at step 1007. Matching the event to a news item discussed in the news service may involve matching the search terms to text strings found in the news item. As used herein, a news service may refer to any online source of information that chronicles current events (e.g., a newspaper's online outlet, a town website, a local community website, an artist's website, a forum, etc.). Therefore, if an event, such as a music show, for example, is discussed in an online article of a local newspaper, the eventing module may access the article and retrieve details about the event for incorporation into the event's event attributes.

The eventing module may then determine whether the similar event matches a calendar entry at step 1009. The matching of the event and a similar calendar entry may involve comparing the search terms with information contained in the calendar entry (e.g., time, place, occasion, description, etc.). The calendar searched by the eventing module may be a calendar of the user that is stored on the content management system, a calendar of the user that is stored on the user device and accessible to the content management system, and/or any other calendar accessible to the content management system (e.g., another user's client-based or content-management calendar). Accordingly, if the search terms match such a calendar entry, any other information stored in the calendar entry may be retrieved for incorporation into the event's event attributes.

The eventing module may then determine whether a shared content item matches the event at step 1011. A shared content item may be shared with the user's account in any suitable manner, including via the content management system, via e-mail, or via a social networking site, for example. If the shared content item matches the event, event attributes defined for the shared content item may be used to edit and/or update the event's attributes. Thus, if a friend shares a photo from "Evan and Paula's Wedding" with the user, the eventing module may parse through the photo's metadata to find any additional information to be incorporated into the event's attributes.

Further, the eventing module may determine whether any features extracted from content items associated with the event match similar features extracted from other content items stored on the content management system at step 1013. The extracted features may be faces, landmarks, and/or other objects recognized by the content management system. The eventing module may employ any suitable facial/object recognition software to recognize and organize the extracted features within the content management system.

If the search terms match one or more attributes of another similar event in steps 1003-1013, process 1000 may proceed to step 1015 in which the eventing module may verify that the similar event is indeed the same event. Verifying that the events are the same event may involve matching the search terms generated in step 1001 with event attributes of the similar event to determine a confidence score regarding the match. In general, the more closely the search terms match the similar event's attributes, the higher the confidence score that may be assigned to the match. If the confidence score reaches a defined confidence threshold, the eventing module may determine that the two events are the same event, and process 1000 may proceed to step 1017. If the confidence score does not reach the defined confidence threshold, process 1000 may end at step 1019.

In some embodiments, the eventing module may use additional data to increase or decrease the confidence score. The additional data may include, for example, a measure of how closely related the user and the other user are and/or whether features (e.g., faces, objects, landmarks, etc.) extracted from content items associated with the user's event match features extracted from the content items associated with the similar event. The eventing module may determine how closely the two users are related by analyzing the users' sharing history—with each other, with other users of the content management system, and/or as determined by analyzing available data from social networking sites.

At step 1017, the eventing module may cross-update event data between the event and the similar event. Cross-updating the event data may involve cross-referencing the event data defined for all content items and ephemeral items associated with the event in the content item database and updating the event data as needed. For example, if any unpopulated or out-of date event attribute fields can be updated in the content item database based on information found stored with respect to the similar event, the eventing module can update those fields in the analyzing step (and vice versa). Steps 1001-1017 may be continuously or periodically looped (unless the event is locked) such that newly available information can be incorporated into the eventing data to keep the events as well-refined as possible.

In one particular example, a user may tag one content item on the user device with an event name, by editing the content item's event name metadata field, for example. The eventing module can receive the event name and either populate or edit an event name event field for all content items associated with that event with the event name tag provided by the user. In another example, event attributes for an event associated with another user's content items/ephemeral items may be more completely populated than the event attributes for the same event associated with the user's content items/ephemeral items. In still yet another example, information derived from an outside source (e.g., a news article posted on the Internet) may be used to fill in or update an event's event attributes.

At step 1019, the eventing module may determine whether to add one or more content items to a super event. A super event may represent a single event that is defined in more than one user account. As one example, if a user's event matches a similar event on the content management system at step 1003, the two events may be made part of a single super event. Super events may help various users find other content items associated with the same event even if those content items were never shared directly with the user. For example, if several users have photos of a super event for "Even and Paula's Wedding," all of those photos may be made available to all users with access to the super event.

If the user (or the content management system) decides to add one or more content items associated with an event to a super event, process 1000 may proceed to step 1021, at which the content items may be added to a virtual collection associated with the super event. Content items added to the virtual collection associated with a super event may be made accessible to any suitable user, such as a user with content items stored on the content management system that are associated with one of the events in the super event, a user who was given access to the super event by another user with sufficient access, and/or a user or non-user of the content management system who has received a share of a content item that is part of the super event. On the other hand, if the user decides not to add one or more content items to a super event, the content items may be kept private and not made a part of the virtual collection of the super event at step 1023.

Figure 11:
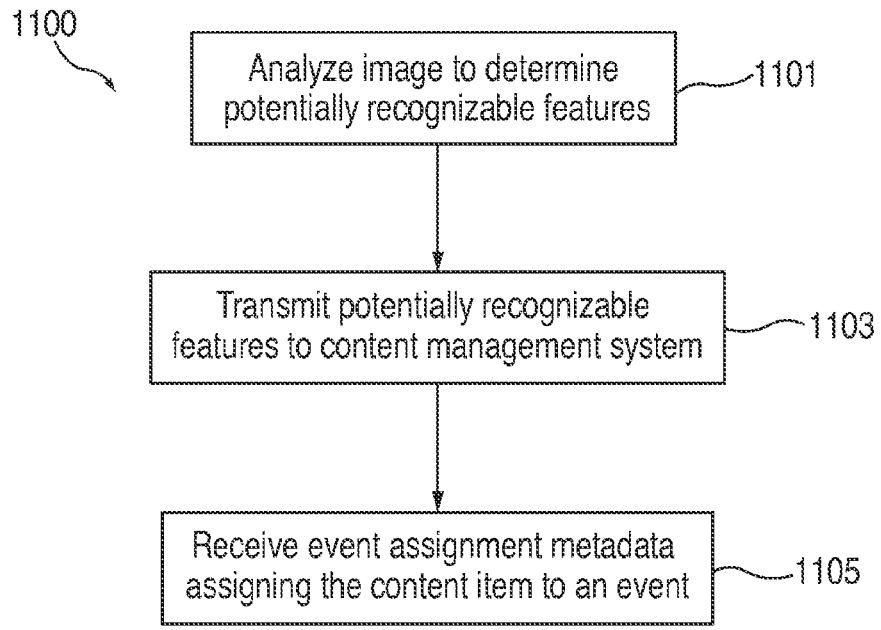

FIG. 11 shows a flowchart of an illustrative process 1100 for using extracted features of content items for ephemeral eventing, in accordance with some embodiments. Process 1100 may begin at step 1101 in which a content item may be analyzed to extract potentially recognizable features at a user device (e.g., user device 102a of FIG. 1). For example, the content item may be a photo or video, and the potentially recognizable features may be faces, landmarks, or other objects visible in the photo or video. The extracted features may be only "potentially" recognizable because it may not be possible to know in advance whether or not the content management system will be able to match the extracted feature(s) with previously recognized features.

The features may be extracted using any suitable method, including pattern recognition, color matching, edge finding, etc. In some embodiments, the features may be extracted as small, still images from a larger image or video file. In other embodiments, the features may represent a clip of an audio file, which may help to identify a song, a speaker, or a particular soundscape associated with a particular geographical location. Because the extracted features may be much smaller than the entire content portion of the content item, uploading the extracted features to the eventing module may take place very quickly (e.g., such that receiving eventing data based on the extracted features may be received in a time period that appears seamless to the user).

At step 1103, the potentially recognizable features may be sent to the content management system. In some embodiments, the potentially recognizable features may be sent to the content management system along with other metadata used for ephemeral eventing, as disclosed above. In other embodiments, the potentially recognizable features may be sent separately, especially if the features are expected to take a relatively long time to upload to the content management system. In any case, the extracted features may be sent to the content management system prior to the full content portion of the content item such that ephemeral eventing may be undertaken using the extracted features.

At step 1105, the user device may receive eventing data that assigns the content item to an event. Besides event data, additional data gleaned by the content management system in connection with the extracted features may be included in the eventing data received by the user device. For example, if the extracted features include faces, the eventing data may include names associated with the faces. In another example, if the extracted features include objects (e.g., the Eiffel Tower), the eventing data may include information (or suitable links to information) about the objects. Because the eventing data may be received very quickly, the content management system may seamlessly enhance the user's experience by providing both eventing and contextual data for their content items.

Figure 12:
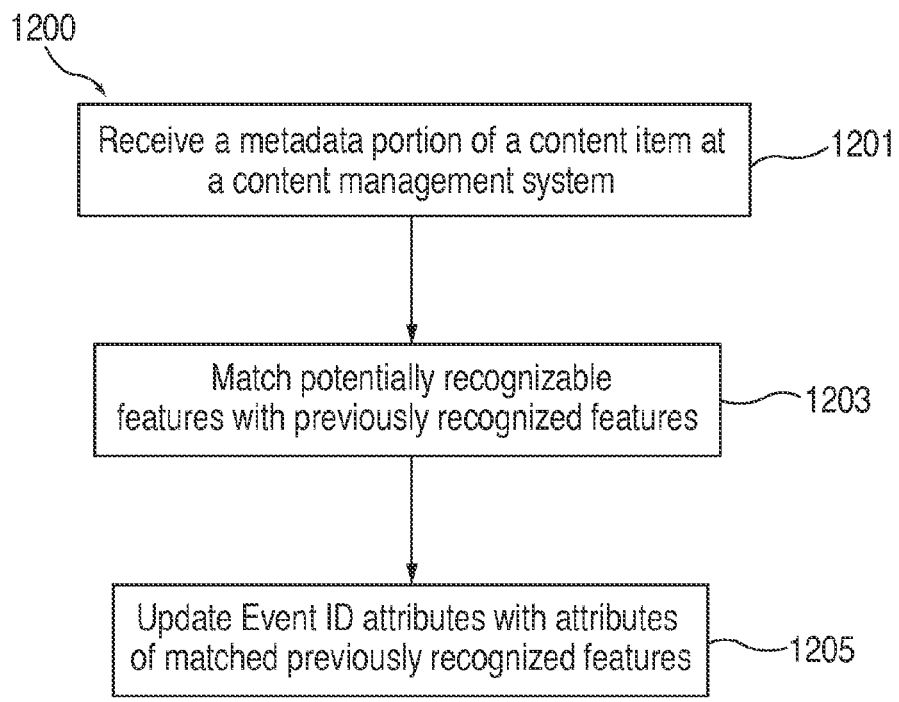

FIG. 12 shows a flowchart of an illustrative process 1200 for using extracted features of content items for ephemeral eventing, in accordance with some embodiments. Process 1200 may begin at step 1201 in which a metadata portion of a content item may be received at an eventing module of a content management system (e.g., eventing module 432 of FIG. 4). The metadata portion may include extracted features that represent portions of a content portion of the content item. The extracted features may have been designated as potentially recognizable features by the user device, for example.

At step 1203, the eventing module of the content management system may match the potentially recognizable features with previously recognized features. A database of previously recognized features may be stored in a memory (e.g., datastore 118) of the content management system. The content management system may employ any suitable facial/object recognition software to perform the matching. The content management system may also perform a search of third-party servers to attempt to match potentially recognizable features with previously recognized features.

At step 1205, the eventing module may update event ID attributes with attributes of the matched previously recognized features. For example, if the eventing module recognizes the Eiffel Tower in a photo, the event data may be updated with various event attributes associated with other content items that include depictions of the Eiffel Tower or other useful data.

In some embodiments, once the content portion of the content item is uploaded to the content management system, the eventing module may identify additional features of the content item. Given that the content management system may have more robust computing resources at its disposal than the typical user device, the eventing module may be capable of performing a more thorough analysis of the content item to recognize features, catalog the features, and/or reference the features against previously recognized features. In circumstances where the eventing module updates eventing data for a content item based on such an analysis, the content management system can subsequently send the updated eventing data to one or more user devices.

Figure 13:
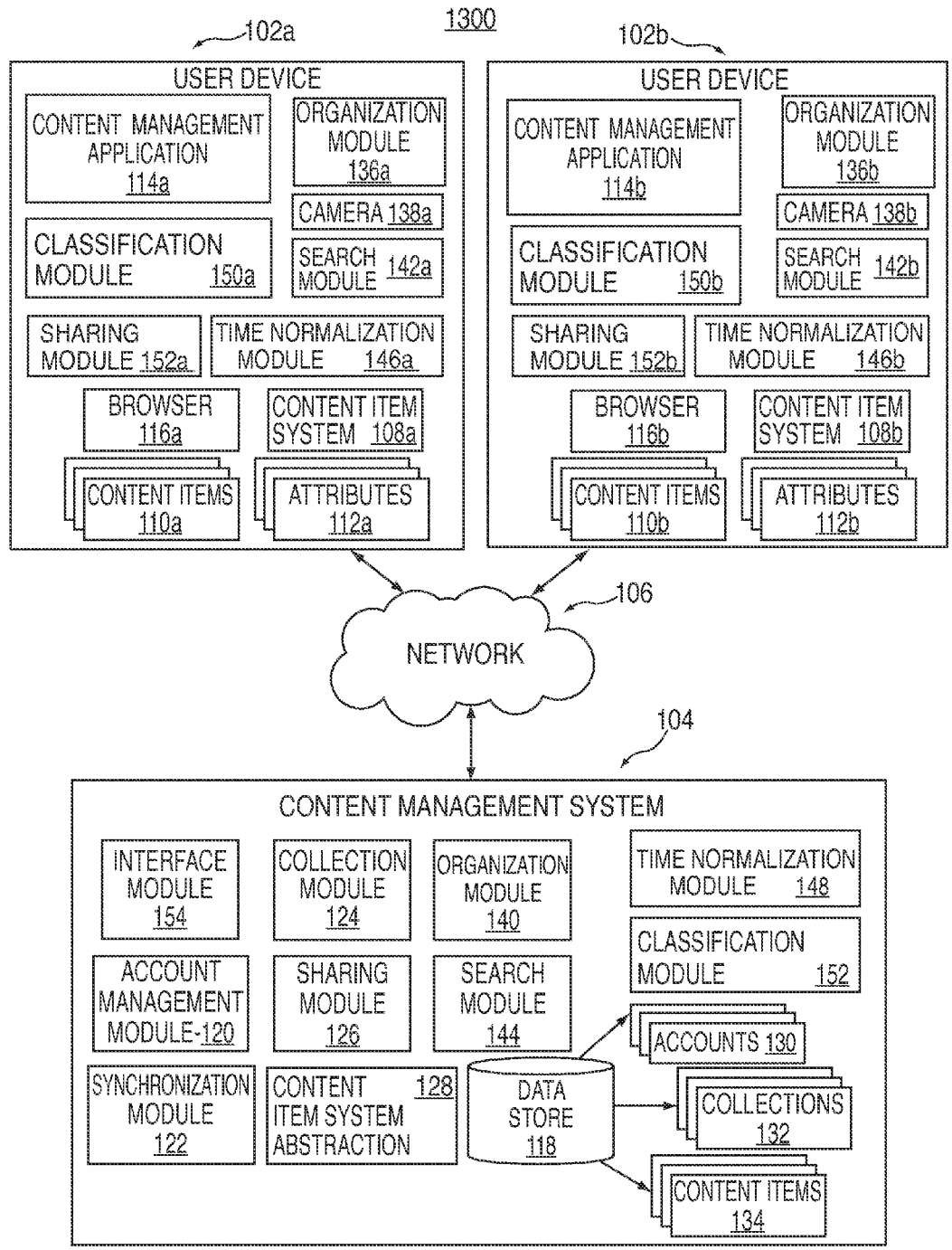
FIG. 13 shows a schematic view of an exemplary content management system for ephemeral eventing, in accordance with some embodiments.

FIG. 13 shows an exemplary system in accordance with various embodiments. In some embodiments, system 1300 of FIG. 13 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104.

Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Implementations

Any suitable programming language can be used to implement the routines of particular embodiments including, but not limited to, the following: C, C++, Java, JavaScript, Python, Ruby, CoffeeScript, assembly language, etc. Different programming techniques can be employed, such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for ephemeral eventing, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method comprising:
identifying a content item on a user device connected to a content management system over a data network, the content item comprising a content portion and a metadata portion;
providing, in a first upload and during a first time period, the metadata portion of the content item to the content management system;
receiving, from the content management system after the first time period and prior to completion of a second time period, event assignment metadata that associates the content item with an event; and
providing, in a second upload and during the second time period, the content portion of the content item to the content management system, wherein the second time period expires after the first time period.

2. The method of claim 1, further comprising:
providing a display of the content item on the user device within an events view that comprises at least some of the event assignment metadata before the content portion is uploaded to the content management system.

3. The method of claim 2, further comprising:
providing the display of the content item in the events view within an expedited time period.

4. The method of claim 1, further comprising:
assigning the content item to the event based on the event assignment metadata.

5. The method of claim 1, wherein providing the metadata portion comprises:
uploading geographic and temporal data associated with the content item.

6. The method of claim 1, wherein the metadata portion comprises one or more of a geolocation, a creation timestamp, at least one access timestamp, at least one upload timestamp, at least one sharing timestamp, user sharing data, user access data, a device_ID that identifies the user device, a local_ID that identifies the content item on the user device, or content features extracted from the content item.

7. The method of claim 1, further comprising:
queuing the content portion for uploading to the content management system one of automatically or manually; and
uploading the content portion based on network conditions, wherein the network conditions required to upload the content portion varies according to a type of content represented in the content item.

8. The method of claim 1, further comprising:
if a network connection is not available for providing the metadata portion, queuing the metadata portion for uploading to the content management system.

9. The method of claim 8, further comprising:
aggregating the metadata portion with other queued metadata portions, wherein providing the metadata portion comprises bulk uploading the metadata portion and other queued metadata portions.

10. The method of claim 1, wherein the event assignment metadata comprises at least a first event ID.

11. The method of claim 10, further comprising:
receiving, from the content management system, a second event ID for the content item upon the content management system determining that the first event ID and the second event ID refer to the same event.

12. A content management system, comprising:
at least one processor; and
a non-transitory computer-readable medium storing instructions that, when executed by the at least one processor, cause the system to:
   receive a metadata portion of a content item from a user device;
   create an ephemeral item based on the metadata portion, the ephemeral item comprising an incomplete version of the content item queued for receiving a content portion of the content item;
   assign event data to the ephemeral item based on the metadata portion; and
   send the event data to the user device for rendering of the content item within a user interface utilizing the event data prior to receiving the content portion of the content item.

13. The content management system of claim 12, further comprising:
a database stored in the memory, wherein the instructions, when executed by at least one processor, further cause the system to:
   generate an entry in the database comprising at least a portion of the metadata portion.

14. The content management system of claim 13, wherein the metadata portion comprises:
a user account ID;
a local ID; and
at least one descriptive metadata item.

15. The content management system of claim 14, wherein the metadata portion further comprises one or more of a geolocation, a creation timestamp, at least one access timestamp, at least one upload timestamp, at least one sharing timestamp, user sharing data, user access data, a device_ID that identifies the user device, a local_ID that identifies the content item on the user device; or content features extracted from the content item.

16. The content management system of claim 13, wherein the instructions, when executed by the at least one processor, further cause the system to, after sending the event data:
receive a content portion of the content item; and
store the content portion in the memory.

17. The content management system of claim 16, wherein the instructions, when executed by the at least one processor, further cause the system to:
convert the ephemeral item to a second content item.

18. The content management system of claim 17, wherein in converting the ephemeral item to a second content item comprises:
assigning a global ID to the entry;
updating an address field of the entry with an address of the content portion in the memory; and
sending the global ID to the user device.

19. The content management system of claim 13, wherein the instructions, when executed by the at least one processor, further cause the system to:
refine the event data based on additional information available to the content management system;
store the refined event data in the entry; and
send the refined event data to the user device.

20. The content management system of claim 19, wherein the instructions, when executed by the at least one processor, further cause the system to:
refine the event data one of continuously or periodically while the event data is not locked by one of a user of the user device or the content management system.

21. A method comprising:
receiving, at a content management system in a first upload and during a first time period, a metadata portion of a content item from a user device connected to the content management system over a data network, the content item comprising a content portion and the metadata portion;
assigning the content item to an event based on the metadata portion with a data processor of the content management system;
sending event assignment metadata that associates the content item with the event from the content management system to the user device prior to completion of a second time period; and
receiving, in a second upload and during the second time period, the content portion of the content item at the content management system, wherein the second time period expires after the first time period.

22. The method of claim 21, wherein sending the event assignment metadata permits the user device to provide a display of the content item in an events view within an expedited time period.

23. The method of claim 21, further comprising:
receiving additional event data associated with the event at the content management system; and
refining the event assignment metadata based on the additional event data.

24. The method of claim 21, wherein assigning the content item to an event comprises:
creating an ephemeral item entry in a content item database stored in a memory of the content management system, wherein the ephemeral item entry comprises at least a portion of the metadata portion and at least a portion of the event assignment metadata.

25. The method of claim 24, further comprising:
storing the content portion in the memory;
associating the content portion with the ephemeral item; and
converting the ephemeral item entry into a second content item by populating a global ID field and an address field of the ephemeral item entry, wherein the global ID field comprises a common identifier for the content item and the second content item, and wherein the address field comprises one of a physical address or a logical address that indicates where in the memory the second content item is stored.

26. The method of claim 25, wherein associating the content portion with the ephemeral item comprises:
matching a first local_ID associated with the content item with a second local_ID stored in the ephemeral item entry.

27. The method of claim 25, further comprising: sending the global_ID to the user device.

* * * * *